(12) United States Patent
Quiquempoix et al.

(10) Patent No.: US 11,494,324 B2
(45) Date of Patent: Nov. 8, 2022

(54) DAISY CHAIN STREAMING MODE

(71) Applicant: Microchip Technology Incorporated, Chandler, AZ (US)

(72) Inventors: Vincent Quiquempoix, Divonne-les-Bains (FR); Yann Johner, Preverenges (CH)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 16/998,097

(22) Filed: Aug. 20, 2020

(65) Prior Publication Data

US 2021/0064564 A1 Mar. 4, 2021

Related U.S. Application Data

(60) Provisional application No. 62/893,216, filed on Aug. 29, 2019, provisional application No. 62/893,202, (Continued)

(51) Int. Cl.
 *G06F 13/00* (2006.01)
 *G06F 13/20* (2006.01)
 (Continued)

(52) U.S. Cl.
 CPC .......... *G06F 13/20* (2013.01); *G06F 13/4068* (2013.01); *G06F 13/4247* (2013.01); (Continued)

(58) Field of Classification Search
 CPC .. G06F 13/00; G06F 13/4256; G06F 13/4068; G06F 13/4291
 (Continued)

(56) References Cited

U.S. PATENT DOCUMENTS 5,132,635 A   7/1992   Kennedy .................. 324/756.05
10,216,678 B2   2/2019   Murtaza et al.
(Continued)

FOREIGN PATENT DOCUMENTS

WO   2007/109887 A1   10/2007   ............. G06F 13/38

OTHER PUBLICATIONS

International Search Report and Written Opinion, Application No. PCT/US2020/048338, 15 pages, dated Nov. 17, 2020.
(Continued)

*Primary Examiner* — Henry Tsai
*Assistant Examiner* — Kim T Huynh
(74) *Attorney, Agent, or Firm* — Slayden Grubert Beard PLLC

(57) ABSTRACT

An apparatus such as a node in a daisy chain of electronic devices includes a serial data input port receive input from an electronic device in the daisy chain. The apparatus includes a serial data output port to send output to another electronic device in the daisy chain. The apparatus includes a chip select input port configured to receive input from a master control unit, and an interface circuit configured to, in a daisy chain streaming mode, and based on a received command and changed edge of a signal on the chip select input port, repeatedly: read data from a data source of the apparatus to yield data, output the data to the serial data output port, and copy other data received at the serial data input port to the serial data output port after the data.

20 Claims, 7 Drawing Sheets

Related U.S. Application Data filed on Aug. 29, 2019, provisional application No. 62/893,209, filed on Aug. 29, 2019.

(51) Int. Cl.
   *G06F 13/42*       (2006.01)
   *G06F 13/40*       (2006.01)
(52) U.S. Cl.
   CPC ...... *G06F 13/4256* (2013.01); *G06F 13/4282* (2013.01); *G06F 13/4291* (2013.01)
(58) Field of Classification Search
   USPC .............................. 710/305–306, 240–266, 2
   See application file for complete search history.

(56) References Cited

U.S. PATENT DOCUMENTS

| | | | | |
|---|---|---|---|---|
| 2003/0074505 A1* | 4/2003 | Andreas | ............. | G06F 13/4256 710/110 |
| 2006/0123635 A1 | 6/2006 | Hurley et al. | .................. | 30/276 |
| 2007/0076502 A1* | 4/2007 | Pyeon | .................... | G11C 5/066 365/221 |
| 2007/0233903 A1 | 10/2007 | Pyeon | ............................... | 710/1 |
| 2008/0028158 A1 | 1/2008 | Bartley et al. | ................ | 711/154 |
| 2010/0280786 A1 | 11/2010 | Gorbold et al. | ............... | 702/120 |
| 2011/0252162 A1 | 10/2011 | Li et al. | ........................... | 710/3 |
| 2012/0166695 A1 | 6/2012 | Venus et al. | .................. | 710/110 |
| 2013/0297829 A1 | 11/2013 | Berenbaum et al. | ............. | 710/3 |
| 2015/0134802 A1 | 5/2015 | Van Den | ....................... | 709/223 |
| 2016/0098371 A1* | 4/2016 | Murtaza | .............. | G06F 13/4282 710/110 |
| 2016/0205066 A1* | 7/2016 | Attarwala | ........... | H04L 61/5038 709/208 |
| 2018/0276157 A1 | 9/2018 | Lofamia et al. | | |

OTHER PUBLICATIONS

International Search Report and Written Opinion, Application No. PCT/US2020/048330, 15 pages, dated Nov. 9, 2020.
International Search Report and Written Opinion, Application No. PCT/US2020/048321, 15 pages, dated Nov. 11, 2020.
U.S. Non-Final Office Action, U.S. Appl. No. 16/998,050, 18 pages, dated May 26, 2021.
U.S. Non-Final Office Action, U.S. Appl. No. 16/998,170, 28 pages, dated Jun. 24, 2021.
U.S. Final Office Action, U.S. Appl. No. 16/998,170, 27 pages, dated Jan. 3, 2022.

* cited by examiner

DAISY CHAIN STREAMING MODE

PRIORITY

The present disclosure claims priority to U.S. Provisional Patent Application No. 62/893,202, filed Aug. 29, 2019, to U.S. Provisional Patent Application No. 62/893,209 filed Aug. 29, 2019, and to U.S. Provisional Patent Application No. 62/893,216 filed Aug. 29, 2019, the contents of which are hereby incorporated in their entirety.

FIELD OF THE INVENTION

The present disclosure relates to communication between microcontrollers and, more particularly, to a daisy chain streaming mode.

BACKGROUND

Microcontroller units (MCUs) and other electronic devices communicate in a variety of ways. However, their number of ports of communication is limited and the number of devices to connect to may be much larger than the number of ports. One way to optimize the usage of the MCU ports a daisy chain configuration, wherein such devices are connected one after the other to each other, and data is propagated from one device to the next device. Daisy chain configurations are often used for large backplane applications and may reduce the number of wires needed, compared to configurations wherein data transfer is in parallel between such devices. A daisy chain configuration uses n ports, wherein n is the number of bits of data to be communicated between any two devices. In the case of serial communication, such as serial peripheral interface (SPI), n may be one. In contrast, wherein a parallel configuration may require m ports, or m times n ports, wherein m is the number of devices that will communicate data to each other. If the number of ports on the device is limited, a daisy chain configuration may help conserve the usage of ports.

Daisy chain configuration may require an interface protocol that facilitates transferring commands and data throughout the daisy chain from one device to another. Inventors of embodiments of the present disclosure have discovered obstacles to streaming data from devices in daisy chain mode in a daisy chain. One such problem discovered by inventors of embodiments of the present disclosure is that daisy chain protocols often suffer from large communication overhead, as simply replicating a read command throughout the daisy chain multiplies the read command length by the length of the chain. Moreover, if data has to be retrieved from each device in the chain, a buffering of this data may take place in each device in order to correctly transmit data from devices further up the daisy chain. The need for buffers may cause a need for a larger die size to accommodate these buffers. Inventors of embodiments of the present disclosure have discovered a daisy chain streaming mode of operation for electronic devices that addresses one or more of these discovered problems.

SUMMARY

Embodiments of the present disclosure may include an apparatus. The apparatus may be a node or electronic device in a daisy chain. The apparatus may include a serial data input port configured to receive input from a first electronic device in the daisy chain. The apparatus may include a serial data output port configured to send output to a second electronic device in the daisy chain. The apparatus may include a chip select input port configured to receive input from a master control unit. The apparatus may include an interface circuit configured to, in a daisy chain streaming mode, based on a received command and on a changed edge of a chip select signal on the chip select input port, repeatedly read data from a data source of the apparatus to yield data, output the data to the serial data output port, and copy data received at the serial data input port to the serial data output port after the data.

Embodiments of the present disclosure may include an apparatus. The apparatus may be a master control unit for a daisy chain of electronic devices. The apparatus may include a serial data output port configured to send output data to a first electronic device of the daisy chain. The apparatus may include a serial data input port configured to receive input data from a last electronic device of the daisy chain. The apparatus may include a chip select output port configured to send output to the electronic devices of the daisy chain. The apparatus may include an interface circuit, configured to set the electronic devices in a daisy chain streaming mode with a command issued through the serial data output port and a first changed edge on a chip select signal issued through the chip select output port. In the daisy chain streaming mode, each given electronic device is configured to repeatedly read data from a data source of the given electronic device to yield data, output the data to a next electronic device in the daisy chain, and output a received data received from a previous electronic device in the daisy chain to the next electronic device in the daisy chain. The interface circuit may be configured to, through the serial data input port, receive a continuous stream of data read by the electronic devices, the continuous stream of data including at least two instances of data from each of the electronic devices.

Embodiments of the present disclosure may include a method for operating an electronic device. The method may include a serial data input port. The method may include, through a serial data input port, receiving input from a first electronic device. The method may include, through a serial data output port, sending output to a second electronic device. The method may include, through a chip select input port, receiving input from a master control unit. The method may include, in a daisy chain streaming mode, based on a received command and on a changed edge of a chip select signal on the chip select input port, repeatedly reading data from a data source of the apparatus to yield data, outputting the first data to the serial data output port, and copying data received at the serial data input port to the serial data output port after the data.

Embodiments of the present disclosure may include a method for operating a master control unit. The method may include, through a serial data output port, sending output data to a first electronic device. The method may include, through a serial data input port, receiving input data from a second electronic device. The method may include, through a chip select output port, sending output to electronic devices. The electronic devices may be connected in a daisy chain and include the first and second electronic devices. The method may include setting the electronic devices in a daisy chain streaming mode with a command issued through the serial data output port, and a changed edge on a chip select signal issued through the chip select output port. In the daisy chain streaming mode, each given electronic device may repeatedly read data from a data source of the given electronic device to yield data, output the data to a next electronic device in the daisy chain, and output a received data received from a previous electronic device in the daisy chain to the next electronic device in the daisy chain. The method may include, through the serial data input port, receiving a continuous stream of data read by the electronic devices, the continuous stream of data including at least two instances of data from each of the electronic devices.

DETAILED DESCRIPTION

Figure 1:
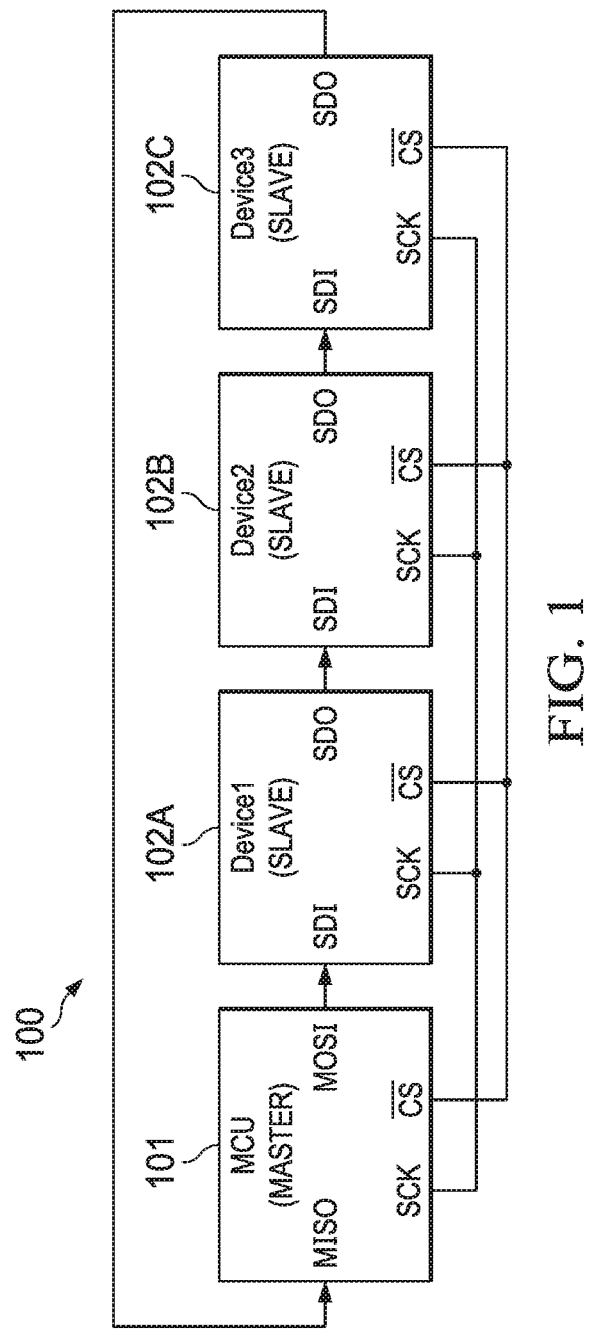
FIG. 1 is an illustration of a system with daisy chained electronic devices, according to embodiments of the present disclosure.

Embodiments of the present disclosure may include a system. The system may include electronic devices connected to one another in a daisy chain fashion. The electronic devices may include a master electronic device or master control unit and any suitable number of other electronic devices. The electronic devices and master control units may be implemented in the same manner or in a different manner. The electronic devices and master control units may each include interface circuits. The interface circuits may be implemented in any suitable combination of analog circuitry, digital circuitry, or instructions for execution by a processor. The interface circuits may handle communication between electronic devices and master control units. A master control unit may be connected to each electronic device in any suitable manner. For example, the master control unit may be connected to each electronic device via a clock signal connection. The master control unit may be connected to each electronic device via a chip select signal connection. The master control unit may be connected to a first electronic device in the daisy chain through a serial data output port of the master control unit and a serial data input port of the first electronic device. A given electronic device of the daisy chain may be connected to another electronic device of the daisy chain through a serial data output port of the given electronic device and a serial data input port of the other electronic device. The master control unit may be connected to a last electronic device in the daisy chain through a serial data input port in the master control unit and a serial data output port in the electronic device.

In combination with any of the above embodiments, an embodiment may include an apparatus, such as an electronic device in the daisy chain. The electronic device may include a serial data input port configured to receive input from a first, other electronic device or a master control unit. The electronic device may include a serial data output port configured to send output to a second, other electronic device. The electronic device may include a chip select input port configured to receive input from an electronic device such as a master control unit.

In combination with any of the above embodiments, the master control unit may be configured to issue commands and data associated with the commands to the electronic devices. When in daisy chain mode, electronic devices may generally propagate information received on their serial data input port to their serial data output port. The master control unit may include a serial data output port configured to send output data to a first electronic device at the top of the daisy chain, a serial data input port configured to receive input data from a second electronic device at the end of the daisy chain, and a chip select output port configured to send output to the electronic devices, and an interface circuit.

In combination with any of the above embodiments, the apparatus of an electronic device may include an interface circuit. The interface circuit may be configured to, in a daisy chain streaming mode, based on a first received command and on a first changed edge of a chip select signal on the chip select input port, repeatedly read data from a data source of the apparatus to yield first data, output the first data to the serial data output port, and copy data received at the serial data input port to the serial data output port after the first data. In combination with any of the above embodiments, the interface circuit may be configured to repeat, without another reception of a second command or additional signals received on the chip select input port, the steps of reading data from the data source to yield first data, outputting the first data to the serial data output port, and copying data received at the serial data input port to the serial data output port. In combination with any of the above embodiments, the interface circuit may be configured to enter the daisy chain streaming mode based upon reception of the first received command through the serial data input port, and, subsequently, reception of one or more second changed edges of the chip select signal on the chip select input port. In combination with any of the above embodiments, the interface circuit may be configured to output the first data to the serial data output port at a time based upon a position of the apparatus in a daisy chain of electronic devices, a length of data to be read by the apparatus, or a number of electronic devices in the daisy chain of electronic devices. The position of the apparatus may be determined in any suitable manner. The length of data to be read by the apparatus, such as datalength, may be based upon the received command. The number of electronic devices in the daisy chain may be determined in any suitable manner. Using one or more of the factors of the position, datalength, and number of electronic devices, the interface circuit may be configured to write data to the next electronic device in a sequence with the other electronic devices such that no data conflicts occur. In combination with any of the above embodiments, the interface circuit may be configured to pause the steps of repeatedly outputting the first data to the serial data output port and copying data received at the serial data input port to the serial data output port based upon a second changed edge of the chip select signal on the chip select input port. In combination with any of the above embodiments, the interface circuit may be configured to resume the steps of repeatedly outputting the first data to the serial data output port and copying data received at the serial data input port to the serial data output port based upon a third changed edge of the chip select signal on the chip select input port.

In combination with any of the above embodiments, the master control unit may include an interface circuit. The interface circuit may be configured to set the electronic devices in a daisy chain streaming mode with a first command issued through the serial data output port and a first changed edge on a chip select signal issued through the chip select output port. In the daisy chain streaming mode, each given electronic device is configured to repeatedly read data from a data source of the given electronic device to yield first data, output the first data to a next electronic device in the daisy chain, and output a received data received from a previous electronic device in the daisy chain to the next electronic device in the daisy chain. In combination with any of the above embodiments, the interface circuit may be configured to, through the serial data input port, receive a continuous stream of data read by the electronic devices, the continuous stream of data including at least two instances of first data from each of the electronic devices. In combination with any of the above embodiments, the interface circuit may be configured to cause the electronic devices to repeatedly provide the continuous stream of data without issuance of a second command or additional signals on the chip select output port. In combination with any of the above embodiments, the interface circuit may be configured to cause the electronic devices to enter the daisy chain streaming mode based upon issuance of a second changed edge on a chip select signal issued through the chip select output port. In combination with any of the above embodiments, the interface circuit may be configured to cause the electronic devices to output the first data to the serial data output port at a time based upon a position of the a respective electronic device in the daisy chain of electronic devices, a length of data to be read by each electronic devices, or a number of electronic devices in the daisy chain of electronic devices. In combination with any of the above embodiments, the interface circuit may be configured to pause the daisy chain streaming mode by issuing a second changed edge of the chip select signal on the chip select output port. In combination with any of the above embodiments, the interface circuit may be configured to resume the daisy chain streaming mode by issuing a third changed edge of the chip select signal on the chip select output port.

FIG. 1 is an illustration of a system 100 with daisy chained electronic devices, according to embodiments of the present disclosure. Any suitable electronic devices may be daisy chained. For example, a microcontroller unit (MCU) 101 may be a master or head node in system 100. In another example, additional electronic devices 102A, 102B, 102C may be slave or sub nodes in system 100. Any suitable number and type of electronic devices may be used. For example, in some implementations, 256 different electronic devices may be daisy chained in system 100. The electronic devices of system 100, such as MCU 101 and electronic devices 102, may be implemented in a same manner or each in a different manner.

System 100 may be implemented within any suitable context. For example, system 100 may be implemented within a data sensor array, vehicle, control system, industrial automation, home automation, factory, test and validation system, or any other suitable application. System 100 may be configured to read or write data via daisy chained serial interfaces in order to accomplish or further any suitable task in such contexts.

MCU 101 may include inputs and outputs, including master in slave output (MISO), configured to receive data from an end of the daisy chain of system 100, such as output of electronic device 102C. MISO may be received through a MISO port. The MISO port may be a serial data input port configured to receive input from other electronic devices. MCU 101 may include an output for master output slave input (MOSI). MOSI may be sent through a MOSI port. The MOSI port may be a serial data output port configured to send output to other electronic devices. For example, MCU 101 which may be configured to send data to a first slave electronic device of the daisy chain of system 100, such as input to electronic device 102A, through the MO SI port. MCU 101 may include a port or pin(s) for a shared clock (SCK), which may be used as a shared clock output port to send a shared clock signal for timing of transfers. MCU 101 may be configured to generate SCK, and it may be routed to each of the other electronic devices 102. MCU 101 may include a port or pin(s) for a chip select (CS) signal, which may be used to communicate various information as discussed below. The CS port may be a chip select output port configured to send input from a master device such as MCU 101 to electronic devices 102. MCU 101 may be configured to generate the CS signal, and it may be routed to each of the other electronic devices 102. The CS signal may be manifested or evaluated in terms of an inverted or logical negative version of the CS signal, denoted as nCS. Any of MCU 101 or electronic devices 102 may be configured to generate a CS/nCS signal, and the CS/nCS signal may be routed to each of the other electronic devices 102 and MCU 101.

Electronic devices 102 may each include a serial data input (SDI) port or pin(s) configured to receive data input from MCU 101 or another one of electronic devices 102. The SDI port may be a serial data input port configured to receive input from other electronic devices. Electronic devices 102 may each include a serial data output (SDO) port or pin(s) configured to send data output to MCU 101 or another one of electronic devices 102. The SDO port may be a serial data output port configured to send output to other electronic devices. Electronic devices 102 may include a shared clock input port to receive an SCK signal and a chip select input port to receive CS or nCS signals. Electronic devices 102 and MCU 101 may further include other suitable number and kind of ports.

MCU 101 and electronic devices 102 may use any suitable communication protocol, such as SPI. MCU 101 may be configured to issue commands or data to electronic devices 102. Such commands may be issued serially through the MOSI port of MCU 101 to the SDI port of electronic device 102A, which may in turn serially propagate the command or data on to other electronic devices such as electronic device 102B through the SDO port of electronic device 102A to the SDI port of electronic device 102B. The width of the command may specify how many serial pulses of data are to be used to represent the command. In turn, electronic device 102B may serially propagate the command or data on to other electronic devices such as electronic device 102C through the SDO port of electronic device 102B to the SDI port of electronic device 102C. In turn, electronic device 102C may serially propagate the command or data on to other electronic devices such as another electronic device (not shown) or to MCU 101 through the SDO port of electronic device 102C to the MISO port of MCU 101.

Each of electronic devices 102 may be configured to propagate a NOP (a no-operation) command on its respective SDO port until the given electronic device 102 recognizes and identifies a predefined command on its respective SDI port that matches a known pattern that is different than a NOP command. A NOP command may be, for example, a series of logic 0 bits. Once recognized and identified, the predefined command may be executed by respective electronic devices 102 when all bits of the predefined command have been fully received on the SDI port. Each electronic device 102 may copy the predefined command that arrived on its SDI port to its SDO port in parallel with executing the predefined command. This may facilitate propagation of the predefined command throughout the daisy chain with the least amount of delay and communication overhead.

The commands may be, for example, to read data. The data and a source of the data that is to be read may be designated by the command. Each electronic device 102 may monitor its SDI port for a read command, and then for data read from others of electronic devices 102 or MCU 101 (whichever is connected further up the daisy chain). Such data from other electronic devices 102 or MCU 101 may need to be propagated through the daisy chain though the SDO ports of electronic devices 102. The data may be propagated to the MISO port of MCU 101. The read command may be recognized by electronic device 102 as being the first command received after a falling edge of the nCS signal that is identified and is different than NOP commands or signals.

Each electronic device 102 may be configured to perform the read command by sending its own data (generated by executing the read command) on its SDO port after having received and recognized the read command, and after copying data of other of electronic devices 102 or MCU 101 received on its SDI port to its SDO port. However, in other implementations, this might require the use of a buffer internal to electronic device 102 and of a length equal to the length of data generated by each electronic device 102.

However, in embodiments of the present disclosure, electronic device 102 may be configured, though SPI interface circuit 204 or any other suitable circuitry, to determine the position of electronic device 102 in the daisy chain. SPI interface circuit 204 may be configured to, for example, count the number of NOPs received before the read command is recognized. The position of the electronic device may be equal to the number of NOPs plus one, if the read command and NOPs are of the same size. With the calculated or known position of electronic device 102 in the daisy chain, electronic device 102 may be configured to recognize the read command and start copying data from other electronic devices 102 further up the daisy chain. Such data may be received on the SDI port and such data may be copied to the SDO port. After the received data is copied, electronic device 102 may be configured to copy its own data generated as a result of the read command on its SDO port. This operation may require a small buffer, such as a single byte wherein read registers are implemented with a one-byte input shift register. If the number of devices in the chain is given as ChainLength, the data on the MISO port of MCU 101, would be a quantity ChainLength of NOP commands, followed by the read command, followed by data from each of electronic devices 102 in the daisy chain. In one embodiment, the data from each of electronic devices 102 may be streamed without any delay in data from respective ones of electronic devices 102 arriving at the MISO port of MCU 101. In another embodiment, the order of data from respective ones of electronic devices 102 arriving at the MISO port of MCU 101 may be data received from the first of electronic devices 102 in the daisy chain ordered to the last of electronic devices 102 in the daisy chain.

The elements of the daisy chain may be configured to operate in a daisy chain mode of operation or in a normal mode of operation. In daisy chain mode, commands and data may be propagated from the SDI port of a given electronic device 102 to its SDO port, so that other electronic devices 102 in the daisy chain may receive and execute commands. In normal mode, commands and data might not be propagated from the SDI port of a given electronic devices 102 to its SDO port.

A given electronic device 102 may enter daisy chain mode from normal mode or exit daisy chain mode to normal mode upon any suitable signals or commands. Such signals or commands may be provided by MCU 101. MCU 101 may determine to set electronic devices 102 in daisy chain mode based upon any suitable condition or criteria.

Figure 2:
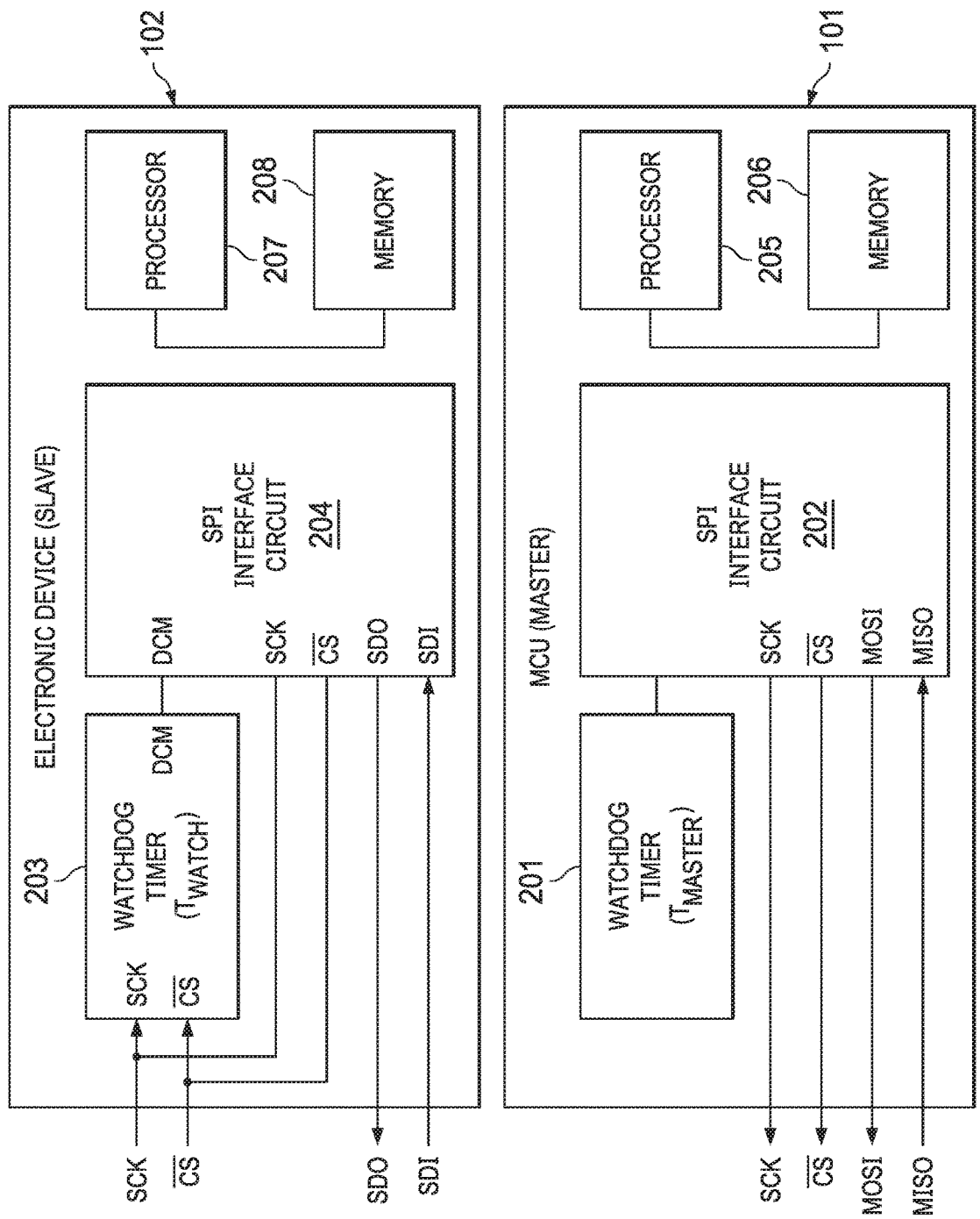
FIG. 2 is a more detailed illustration of a master control unit and of an electronic device, according to embodiments of the present disclosure.

FIG. 2 is a more detailed illustration of MCU 101 and electronic device 102, according to embodiments of the present disclosure.

MCU 101 may include a processor 205 communicatively coupled to a memory 206. Processor 205 may include any suitable processor, and memory 206 may be any suitable persistent or non-persistent memory. Not shown are any suitable number and kind of peripherals or auxiliary circuits used by MCU 101 to perform whatever other tasks MCU 101 is designed to perform, such as an analog to digital converter (ADC) or register. Moreover, processor 205 may be configured to load and execute instructions stored in memory 206 in order to perform any suitable task.

Electronic device 102 may include a processor 207 communicatively coupled to a memory 208. Processor 207 may include any suitable processor, and memory 208 may be any suitable persistent or non-persistent memory. Not shown are any suitable number and kind of peripherals or auxiliary circuits used by electronic device 102 to perform whatever other tasks electronic device 102 is designed to perform, such as an ADC or register. Moreover, processor 207 may be configured to load and execute instructions stored in memory 208 in order to perform any suitable task.

MCU 101 and electronic device 102 may each include respective SPI interface circuits 202, 204. SPI interface circuits 202, 204 may be implemented by analog circuitry, digital circuitry, logic, instructions for execution by a processor (such as processor 205, 207, respectively), or any suitable combination thereof. The specific implementation of SPI interface circuits 202, 204 may be the same or different with respect to one another. In one embodiment, SPI interface circuits 202, 204 may be implemented in a same manner and configured to operate differently based upon, for example, a register or system or user setting. SPI interface circuit 202 may be configured to operate for the purposes of a master node such as MCU 101 and SPI interface circuit 204 may be configured to operate for the purposes of an electronic device such as electronic device 102.

In MCU 101, SPI interface circuit 202 may be configured to generate outputs to SCK and CS ports. SPI interface circuit 202 may be configured to generate outputs to send commands or data to electronic devices 102 through its MOSI port. SPI interface circuit 202 may be configured to receive data through its MISO port. SPI interface circuit 202 may be configured to generate outputs to SCK and CS ports to instruct electronic devices 102 to enter or exit different modes of operation.

In electronic device 102, SPI interface circuit 204 may be configured to monitor inputs from SCK and CS ports of electronic device 102. In one embodiment, SPI interface circuit 204 may be configured to monitor the CS port for indications of whether to reset itself, or to recognize and then execute commands incoming on the SDI port and propagate output data on the SDO port. When SPI interface circuit 204 resets itself, it may return to a reset state in the state machine therein. Memory buffers of reads or writes may be cleared. The SDO port may be set in high impedance mode. Current might not be actively consumed. SDI and SCK signals might not be internally routed. SPI interface circuit 204 might remain waiting for an nCS falling edge to resume operation. However, a bit or other information indicating whether electronic device 102 is in a streaming mode may be preserved, and not cleared, by an nCS rising edge. If such a bit or other information is not preserved, then streaming mode might need to be relaunched each time an nCS rising edge is issued. Furthermore, when performing a read command, SPI interface circuit 204 may be configured to read data from a designated source and provide its own data through the SDO port.

Electronic device 102 may include any suitable number and kind of mechanisms for use with the operations of SPI interface circuit 204. For example, SPI interface circuit 204 may utilize a watchdog timer 203. Watchdog timer 203 may be implemented by any suitable combination of digital circuitry, analog circuitry, and logic, or any combination thereof. For example, watchdog timer 203 may be implemented as a timer that counts down each clock cycle from a set value and generates an alert, signal, or other indicator that the number of clock cycles—and thus time—has elapsed. Watchdog timer 203 may be implemented in any suitable manner as a timer that determines if a certain time has elapsed. For example, watchdog timer 203 may be implemented by comparing the discharge of a charged capacitor, using the known discharge rate from the capacitor and comparing the charge of the capacitor with a threshold value. Moreover, watchdog timer 203 may be implemented as a timer without need of receiving CS or SCK signals. Although shown separately from SPI interface circuit 204, watchdog timer 203 may be incorporated within SPI interface circuit 204. SPI interface circuit 204 may be configured to set watchdog timer 203 upon detection of an nCS rising edge signal on the CS port, and to detect if and when watchdog timer 203 expires. The value set in watchdog timer 203 may be a time period for which electronic device 103 will wait after detection of an nCS rising edge signal on the CS port without reception of a SCK clock changed edge or additional nCS changed edge. Such a time period may be given as TWatch. If a changed edge on the SCK port or a rising edge of an nCS signal on the CS port are detected before expiration of watchdog timer 203, SPI interface circuit 204 may be configured to return to a daisy chain mode without being in streaming mode. Routing of SCK or CS signals may be provided directly to watchdog timer 203 or through SPI interface circuit 204.

MCU 101 may include any suitable number and kind of mechanisms for use with the operations of SPI interface circuit 202. For example, SPI interface circuit 202 may utilize a watchdog timer 201. Watchdog timer 201 may be implemented by any suitable combination of digital circuitry, analog circuitry, and logic, such as a timer that counts down each clock cycle from a set value and generates an alert, signal, or other indicator that the number of clock cycles—and thus time—has elapsed. Although shown separately from SPI interface circuit 202, watchdog timer 201 may be incorporated within SPI interface circuit 202. SPI interface circuit 202 may be configured to set watchdog timer 201 upon issuance of commands or CS signals to electronic devices 102. The value set in watchdog timer 201 may be a time period for which MCU 101 will wait after issuance of commands or CS signals to take further action, or to verify that the commands or CS signals were received correctly. Such a time period may be given as TMaster. Routing of SCK or CS signals may be provided directly to watchdog timer 201 or through SPI interface circuit 202.

Figure 3:
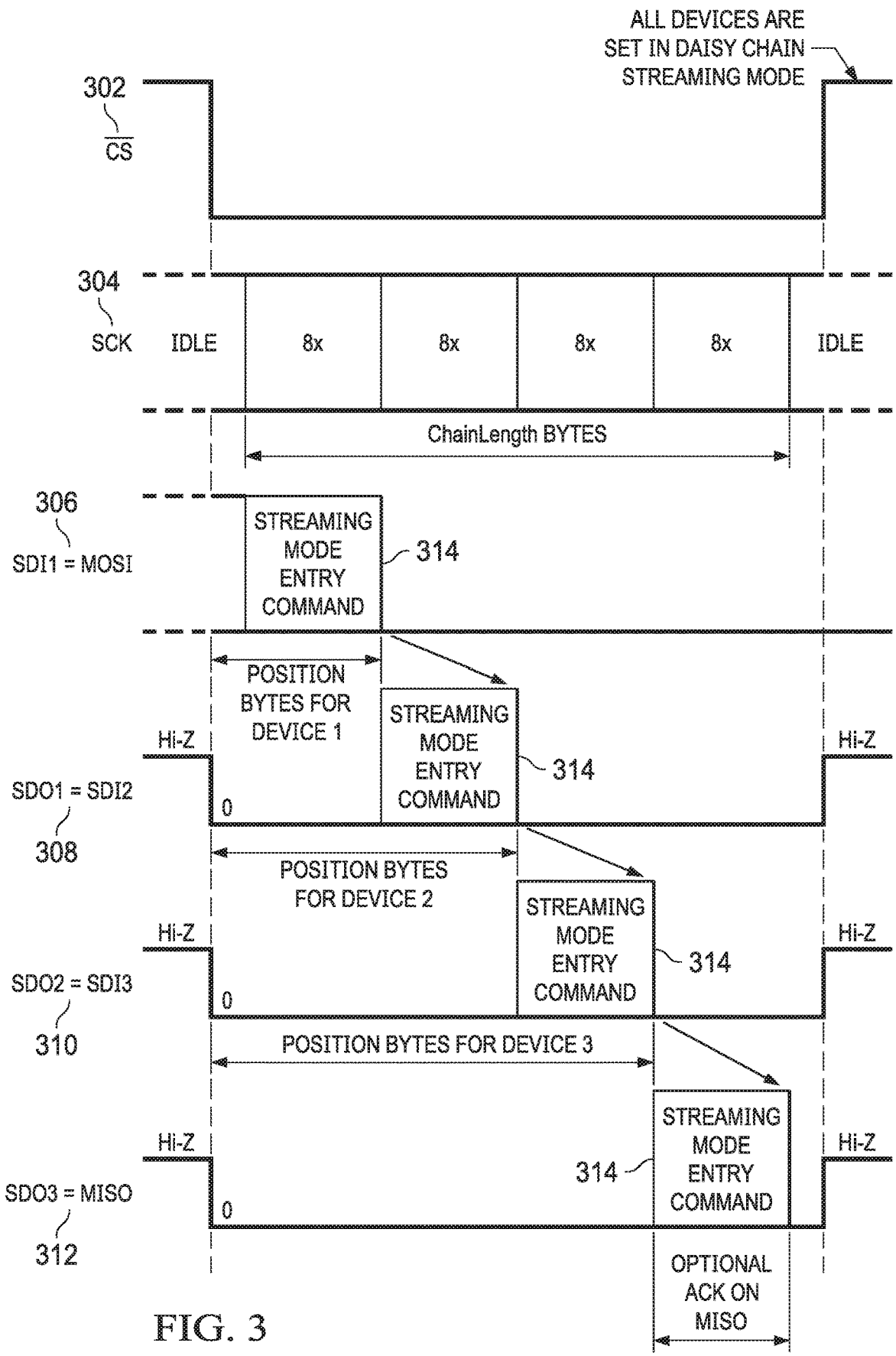
FIGS. 3 and 4 are illustrations of timing diagrams of issuing a command for setting a streaming mode in a daisy chain of electronic devices, and then performing the reading of data in a streaming mode, according to embodiments of the present disclosure.
Figure 4:
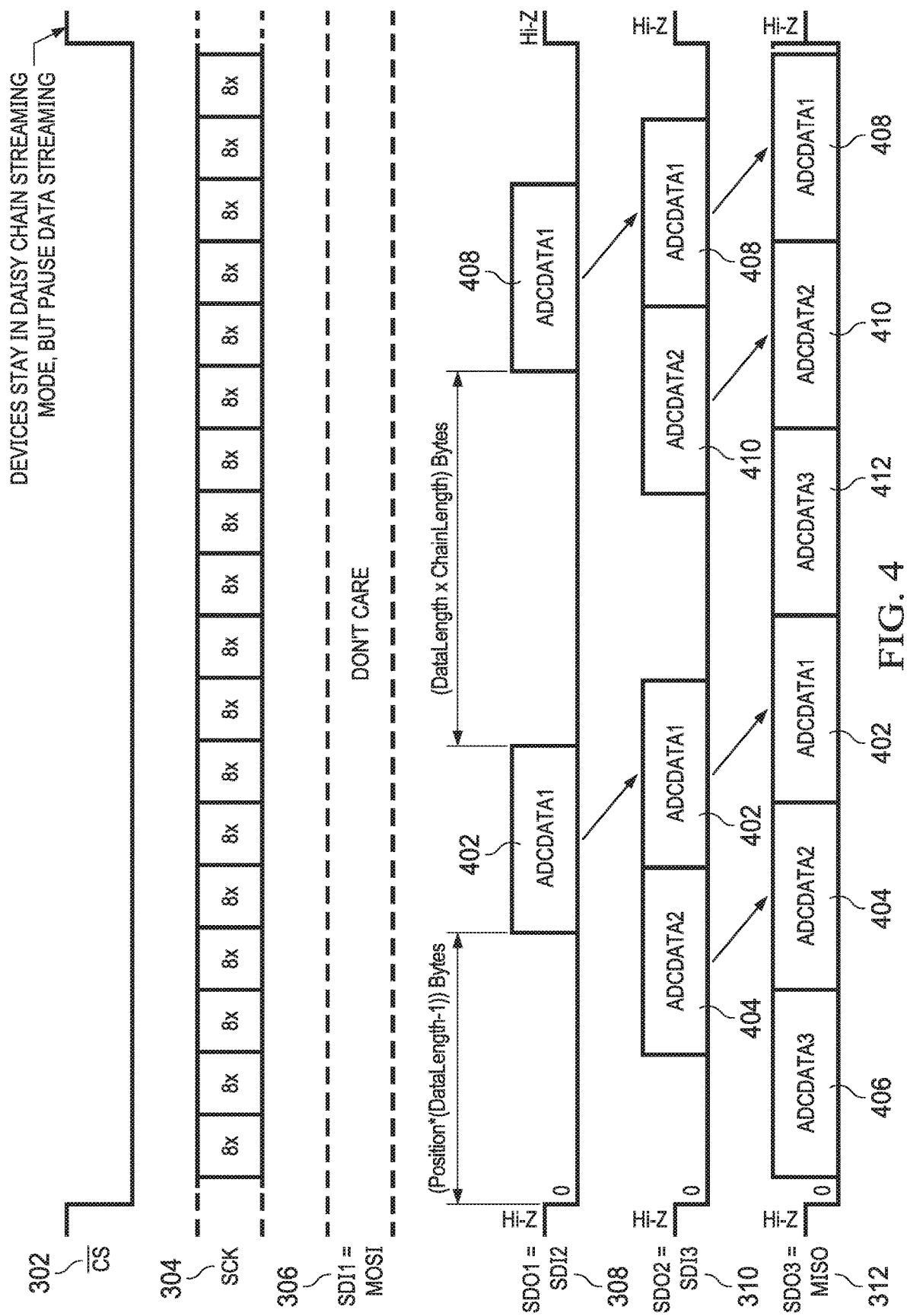

FIGS. 3 and 4 are illustrations of timing diagrams of issuing a command for setting a streaming mode in a daisy chain in system 100, and then performing the reading of data in a streaming mode, according to embodiments of the present disclosure.

A streaming mode may include operation of electronic devices 102 to continuously read data. The data may be read from designated sources. The source for the read may also be specified by the command. Any suitable source may be used. The source may be within or communicatively coupled to electronic devices 102. For example, such sources may include a designated ADC within each electronic device 102 that is taking measurements or gathering data.

MCU 101 may cause system 100 to perform continuous reading of data so as to quickly gather such measurements or other collected information. MCU 101 may cause these operations by issuing a command, such as a streaming mode entry command 314. Streaming mode entry command 314 may be implemented as, for example, a one-byte instruction.

Entry into streaming mode may be based upon system 100 already entering daisy chain mode. Streaming mode operation may be a subset of daisy chain operation. Entry may have been made into daisy chain mode using any suitable process.

Streaming mode entry command 314 may instruct electronic devices 102 to continuously read data therein and stream output to MCU 101. Streaming mode entry command 314 may be sent from MCU 101 to the first of electronic devices 102 in the daisy chain configuration. In one embodiment, each electronic device 102 may be configured to propagate streaming mode entry command 314 to the next electronic device 102 (or, in the case of the last electronic device 102 of the daisy chain, to MCU 101 on its MISO port) in the daisy chain. In another embodiment, after propagating streaming mode entry command 314, each electronic device 102 may be configured to wait until receiving a subsequent signal to begin performing streaming mode entry command 314. In one embodiment, such a subsequent signal may include two changed edges of a chip select signal, such as nCS, issued by MCU 101. From a first changed edge of the chip select signal, such as a rising edge on the nCS signal, electronic device 102 may validate entry into streaming mode. From a second changed edge of the chip select signal, such as a falling edge on the nCS signal, electronic device 102 may begin performing the streaming mode operations.

Streaming mode entry command 314 may be configured to cause electronic devices 102 to, once initiated and executing, continually execute a series of operations (such as reads) without interruption or additional assertions of nCS, commands, or resets. Streaming mode entry command 314 may be issued to a first electronic device 102 of the daisy chain, which may propagate streaming mode entry command 314 to the next electronic device 102 in the daisy chain. This propagation may continue until streaming mode entry command 314 is sent to MCU 101. MCU 101 may then send a follow-up signal, such as two changed edges on an nCS signal on the CS ports of each electronic device 102, which may then trigger reading of data in electronic devices 102 and propagating the resulting data between electronic devices 102. Each electronic device 102, to perform the daisy chain streaming mode operation for reading data, may read data on a data source in or communicatively coupled to electronic device 102, yielding a first data. Electronic device 102 may be configured to copy the first data to the next instance of electronic device 102. When not reading data within electronic device 102 and copying results to the next instance of electronic device 102, electronic device 102 may be configured to copy its serial data input to its serial data output.

Graph 302 illustrates a plot of an nCS signal issued by MCU 101 and received by electronic devices 102. The nCS signal may be high (a logic one) initially. A falling edge of the nCS signal may be issued by MCU 101 to a low value (a logic zero) and detected at each electronic device 102. Thereafter, MCU 101 may issue clock signals via SCK to each of electronic devices. Elapsed time within the context of FIG. 3 may be expressed in bytes, wherein a given byte represents eight clock pulses. Represented in FIG. 3 are SCK signals issued in eight-pulse blocks, represented as "8×". Each such block may thus be a byte long.

Graph 304 illustrates a plot of an SCK signal issued by MCU 101 and detected at each electronic device 102. During serial data transfer between MCU 101 and electronic devices 102, each pulse of the SCK signal may be used to transfer a single bit serially per serial data line. Thus, the block represented by "8×" may represent the time and clock signals for transferring a single byte per serial data line.

Graph 306 illustrates a plot of signals issued by MCU 101 on its MOSI port and received by electronic device 102A on its SDI port, denoted as SDI1.

Graph 308 illustrates a plot of signals issued by electronic device 102A on its SDO port, denoted as SDO1, and received by electronic device 102B on its SDI port, denoted as SDI2.

Graph 310 illustrates a plot of signals issued by electronic device 102B on its SDO port, denoted as SDO2, and received by electronic device 102C on its SDI port, denoted as SDI3.

Graph 312 illustrates a plot of signals issued by electronic device 102C on its SDO port, denoted as SDO3, and received by MCU 101 on its MISO port.

In one embodiment MCU 101 may be configured to command electronic devices 102 to implement a streaming mode over two phases of signals to electronic devices 102. The first phase may be a streaming mode entry phase, wherein MCU 101 configures electronic devices 102 to ready themselves for streaming mode entry command 314 to perform continuous streaming operation such as a read. The first phase may be illustrated in FIG. 3. In the second phase, such a continuous read operation may be performed, and thus be considered as a streaming data phase. The second phase may be illustrated in FIG. 4. Graphs 302, 304, 306, 308, 310, 312 are continued from FIG. 3 to FIG. 4.

The streaming mode entry phase and the streaming data phase may each be defined fully or in part by assertions of nCS by MCU 101 in combination with issuance of streaming mode entry command 314. The streaming mode entry phase of FIG. 3 may be initiated by MCU 101 issuing a changed edge of a signal to the CS ports of electronic devices 102. Such a changed edge may be a falling edge of an nCS signal as shown in graph 302 in FIG. 3. The streaming mode entry phase may continue while MCU 101 holds nCS at a logic zero level for a period of time. The streaming data phase may end upon streaming mode entry command 314 propagating to each electronic device 102 and consequently MCU 101 issuing another changed edge of a signal to the CS ports of electronic devices 102. Such a changed edge may be a rising edge of an nCS signal, as shown in graph 302 in FIG. 3. In one embodiment, the rising edge of the nCS signal may be coincident, simultaneous, or nearly simultaneous with when electronic device 102C, the last electronic device of the daisy chain, has fully received streaming mode entry command 314. In another embodiment, the rising edge of the nCS signal may instead be after electronic device 102C has propagated streaming mode entry command 314 back to MCU 101, which may serve as an optional acknowledgment signal to the MISO port of MCU 101.

During the streaming mode entry phase, each electronic device 102 may calculate its own position within the daisy chain. This may be given as Position. Each electronic device 102 may calculate the length of the daisy chain, which may be the total number of electronic devices 102 connected in the daisy chain. This may be given as ChainLength. The determination of Position may be performed by counting the bytes (if each command is one byte long) between the nCS falling edge initiating the streaming mode entry phase and the end of the streaming mode entry command. Such a count may be made in any suitable manner, such implemented within SPI interface circuit 204 by a counter (not shown) connected to SCK and triggered by recognition of the streaming mode entry command at the SPI port. ChainLength may be determined by the number of bytes received in total during the streaming mode entry phase, if no acknowledgement is required by MCU 101, or by the number of bytes received in total during the streaming mode entry phase less one, if an acknowledgment is required to be received by MCU 101 on its MISO port before the nCS changed edge is performed. Whether or not an acknowledgement is required may be programmed or hardwired into each electronic device 102. ChainLength may determine instead in a specific phase before the streaming mode entry phase by any suitable mechanism.

Any suitable time may elapse between the end of the phase of FIG. 3 and the phase of FIG. 4. During this time, as nCS is maintained at a logic high, electronic devices 102 are kept in a reset state wherein each electronic device 102 has its SDO port placed in high impedance. Moreover, SDI and SCK ports are not active and may be disabled. However, an indicator that streaming mode has been enabled may be set on each electronic device 102. This may include, for example, a register value. The indicator may be used by electronic device 102 to determine that electronic device 102 is in daisy chain streaming mode.

In FIG. 4, data streaming may be initiated by MCU 101 issuing a changed edge of a signal to the CS ports of electronic devices 102. Such a changed edge may be a falling edge of the nCS signal, as shown in graph 302 in FIG. 4. The data streaming may continue while MCU 101 holds nCS at a logic zero level for a period of time. Subsequently, electronic devices 102 may stream data according to the command, as discussed in further detail below. In one embodiment, data streaming may end upon MCU 101 issuing another changed edge of a signal to the CS ports of electronic devices 102. However, in another embodiment, such a changed edge of the signal to the CS ports of electronic devices 102 might not end a data streaming mode altogether. In such an embodiment, a changed edge of the signal to the CS ports of electronic devices 102, such as a rising edge of the nCS signal, might cause electronic devices 102 to stop streaming data. Nevertheless, in a further embodiment electronic devices 102 may remain in streaming mode while pausing the actual streaming of data. Electronic devices 102 may remain configured to stream data and may await a signal from MCU 101 to resume streaming data. For example, upon issuance of another changed edge of the signal to the CS ports of electronic devices 102, such as a falling edge of the nCS signal (not shown), electronic devices 102 may resume streaming data. Such resumption might not require reissuance of streaming mode entry command 314. Data streaming mode may end upon a reset signal by MCU 101. The reset signal may be sent by MCU 101 in any suitable manner, such as expiration of a watchdog timer without any activity from MCU 101, or to send an nCS low pulse without an accompanied SCK pulse.

As shown in FIG. 3, MCU 101 may be configured to issue streaming mode entry command 314 to each of electronic devices 102 via a daisy chain transfer. In a further embodiment, streaming mode entry command 314 may be a read command. In yet a further embodiment, no data might be read by electronic devices 102 until all electronic devices 102 have received streaming mode entry command 314. In another embodiment, as shown in FIG. 4, electronic devices 102 may be configured to continuously perform the data operation specified by streaming mode entry command 314. In a further embodiment, electronic devices 102 may be configured to continuously stream data that is read from electronic devices 102 to MCU 101. Based upon the receipt of streaming mode entry command 314 at electronic devices 102 as shown in FIG. 3, electronic devices 102 may continuously perform streaming mode entry command 314 based on initiation of data streaming by a second falling edge of nCS provided by MCU 101 as shown in FIG. 4.

As shown in FIG. 3, MCU 101 may issue streaming mode entry command 314 to electronic device 102A. Streaming mode entry command 314 may specify that that the recipient instance of electronic device 102 is to continuously read data after a rising edge of nCS and then another falling edge of nCS are received by electronic device 102. The location from which data will be read may be implied or included in streaming mode entry command 314. Electronic device 102A may finish reading streaming mode entry command 314 through its SDI1 port.

As shown in graph 308, after reading streaming mode entry command 314 through its SDI1 port, electronic device 102A may begin writing streaming mode entry command 314 on its SDO1 port to electronic device 102B on its SDI2 port.

As shown in graph 310, after reading streaming mode entry command 314 through its SDI2 port, electronic device 102B may begin writing streaming mode entry command 314 on its SDO2 port to electronic device 102C on its SDI3 port.

Electronic device 102C might not write streaming mode entry command 314 on its SDO3 port to MCU 101 on its MISO port, because MCU 101 may interrupt this process by issuing a changed edge on the nCS signal on the CS ports of electronic devices 102. In some cases, an attempt by electronic device 102C to so-write streaming mode entry command 314 may be simply ignored by MCU 101, or used as validation that electronic device 102C received streaming mode entry command 314 successfully.

The changed edge, such as a rising edge, issued by MCU 101 on the nCS signal on the CS ports of electronic devices 102 may cause each electronic device 102 to output a high impedance value to its respective SDO port.

In one embodiment, each of electronic devices 102 may be configured to, upon receipt of streaming mode entry command 314, thereafter provide a default output (such as a logical low level) to its respective SDO port. The rising edge of the nCS signal may be a signal issued by MCU 101 that streaming mode entry command 314 has propagated to each of electronic devices 102.

Subsequently, as shown in FIG. 4, the falling edge of the nCS signal may be a signal issued by MCU 101 that data streaming may begin, and that data is to be subsequently read from electronic devices 102. The falling edge of the nCS signal may be performed as soon as possible after the last instance of electronic devices 102 in the daisy chain (such as electronic device 102C) has received streaming mode entry command 314, as shown in FIG. 3.

Returning to FIG. 4, and in order to propagate information that has been read according to streaming mode entry command 314, electronic devices 102 may utilize their position in the daisy chain. Electronic devices 102 may calculate their position (Position) in the daisy chain in any suitable manner. Furthermore, electronic devices 102 may calculate when to subsequently add their data to the propagation of information through the daisy chain in any suitable manner. Such calculations may be performed by, for example, instances of SPI interface circuit 204 based on values of arrival times of CS signals, as discussed above, To perform these calculations, electronic devices 102 may use the length of the data (DataLength) to be read in a single contiguous block by a given electronic device 102, the length of the daisy chain (the number of electronic devices 102, ChainLength), the Position of the respective electronic device 102 in the daisy chain.

The length of the data to be read in a single contiguous block by a given electronic device 102 may be specified by or implied by streaming mode entry command 314. For example, in FIG. 4 the length of data to be read in a single contiguous block by a given electronic device 102 may be three bytes. As discussed above, this length may be referenced as DataLength.

The position (Position1) of electronic device 102A may be calculated as two positions from the end of the daisy chain. The position (Position2) of electronic device 102B may be calculated as one position from the end of the daisy chain. The position (Position3) of electronic device 102C may be calculated as zero, and the last position at the end of the daisy chain.

In one embodiment, electronic devices 102 may propagate their newly read data to other electronic devices 102 and MCU 101 in a reverse order compared to the order of electronic devices 102 in the daisy chain. For example, data populated and propagated through the daisy chain and arriving back at MCU 101 may first include data from electronic device 102C, then electronic device 102B, and then electronic device 102A. However, in various embodiments, the normal order of electronic devices 102 in the daisy chain may be used for ordering data, wherein data populated and propagated through the daisy chain and arriving back at MCU 101 may match the order of electronic devices 102 in the daisy chain. In such a case, the Position might be defined instead as the relative position of the given electronic device to the beginning of the daisy chain.

Once the Position of a given electronic device 102 is known to the given electronic device 102, the given electronic device 102 may then calculate when to begin propagating its own data to the rest of the daisy chain during data streaming. Such a timing of when to copy its own data into the daisy chain may be expressed as an offset from the receipt of a falling edge of nCS shown in FIG. 4. Such a calculation may be performed so that each of electronic devices 102 only transmit data at an appropriate time, when such a transmission will not interfere with other electronic devices 102 in the daisy chain. The interferences may be prevented even when such other electronic devices 102 are before or after the given electronic device 102 in the daisy chain. Given DataLength (three bytes for each read) and an individual value of Position, each electronic device 102 may copy its own data into the daisy chain at a time in phase 842 given by (Position*(DataLength−1)). Thus, electronic device 102A may copy its own data into the daisy chain at (Position1*(3−1)), calculated as (2(3−1)), resulting in four bytes. Electronic device 102B may copy its own data into the daisy chain at (Position2(3−1)), calculated as (1*2), resulting in two bytes. Electronic device 102C may copy its own data into the daisy chain at (Position3*(3−1)), calculated as (0*2), resulting in zero bytes. New data may be copied consecutively, reoccurring in a period given by (ChainLength*Datalength), or nine bytes in the case of FIG. 4. Electronic device 102 is thus configured to output its locally read data to its serial data output port at a time based upon a delay between reception of streaming mode entry command through its serial data input port and a second changed edge of a chip select signal on its chip select input port.

Such calculations of an offset of time of when an electronic device 102 is to copy its own data into the daisy chain may be performed at any time after the electronic device 102 is placed in streaming mode, but in any case before data is actually streamed.

A given electronic device 102 may be configured to copy its own data periodically at certain positions determined by the offset and the period. Otherwise, the given electronic device 102 may be configured to simply copy the contents at its SDI port to its SDO port with a 1 byte delay. This effectively copies the previous data incoming from electronic devices 102 further up the daisy chain.

In FIG. 4, upon the falling edge of the nCS signal, may begin reading the specified data, providing such data to others of electronic devices 102 and MCU 101, and propagating data from others of electronic devices 102 to still others of electronic devices 102 and MCU 101. The output of MOSI to SDI1 may be ignored. Electronic devices 102 may issue a default value, such as zero, when not otherwise propagating issued data.

As shown in graph 308, electronic device 102A may begin providing its newly read data to electronic device 102B according its specific offset, whose calculation is discussed above. The offset may be sufficient for electronic device 102A to allow electronic devices 102B, 104C to add their own newly read data to the data stream to be sent to MCU 101. In one embodiment, the offset may cause electronic device 102A to delay sending its newly added data until sufficient room will be available for all data of electronic devices 102B, 104C to be included in the data stream by the time the newly read data for electronic device 102A has propagated through such electronic devices 102B, 104C.

For example, as shown in graph 308, electronic device 102A may read data according to streaming mode entry command 314, yielding data 402. The offset may be four bytes. Thus, electronic device 102A may wait until four bytes have elapsed after the falling edge of the nCS signal, and begin writing data 820 to electronic device 102B. Data 402 may be three bytes long.

Subsequently, electronic device 102A may again read data and begin writing the newly read data. This newly read data may be referred to as data 408. Electronic device 102A may begin writing data 408 at a time of (ChainLength*DataLength), or nine bytes, after electronic device 102A wrote its newly read data the first time. If not otherwise stopped by MCU 101, electronic device 102A may repeat this process of reading new data and writing the newly read data to electronic device 102B every nine bytes.

As shown in graph 310, electronic device 102B may begin providing its newly read data to electronic device 102C according to its specific offset, whose calculation is discussed above. The offset may be sufficient for electronic device 102B to allow electronic device 102C to add its own newly read data to the data stream to be sent to MCU 101. In one embodiment, the offset may cause electronic device 102B to delay sending its newly added data until sufficient room will be available for all data of electronic devices 102 to be included in the data stream by the time the newly read data for electronic device 102B has propagated through the daisy chain.

For example, as shown in graph 310, initially there may be no data from electronic device 102A for electronic device 102B to propagate. Thus, electronic device 102B may output a logic low signal through its SDO2 port to electronic device 102C. Electronic device 102B may read data according to streaming mode entry command 314, yielding data 404. The offset may be two bytes. Thus, electronic device 102B may wait until two bytes have elapsed from the falling edge of the nCS signal, and begin writing data 404 to electronic device 102C. Data 404 may be three bytes long. Meanwhile, data 402 may have arrived from electronic device 102A. Upon completion of writing data 404 to electronic device 102C, electronic device 102B may begin propagating the received data 402 from electronic device 102A to electronic device 102C. Subsequently, electronic device 102B might continue to propagate the low logic signal from electronic device 102A to electronic device 102C.

Electronic device 102B may again read data and begin writing the newly read data. This newly read data may be referred to as data 410. Electronic device 102B may begin writing data 410 to electronic device 102C at a time of (ChainLength*DataLength), or nine bytes, after electronic device 102B first began writing data 404. If not otherwise stopped by MCU 101, electronic device 102B may repeat this process of reading new data and writing the newly read data to electronic device 102C every nine bytes. Furthermore, electronic device 102B may again propagate received data from electronic device 102A to electronic device 102C, such as data 408.

As shown in graph 312, electronic device 102C may begin providing its newly read data to MCU 101 according to its specific offset, whose calculation is discussed above. The offset for electronic device 102C may be zero, so electronic device 102C may immediately begin providing its newly read data to MCU 101. A delay shown in FIG. 4 may result from the time needed to receive the falling edge of the nCS signal. Electronic device 102C may read data according to streaming mode entry command 314, yielding data 406. Data 406 may be three bytes long, may be written to MCU 101. Meanwhile, data 404 may have arrived from electronic device 102B. Upon completion of writing data 406 to MCU 101, electronic device 102C may begin propagating the received data 404 from electronic device 102B to MCU 101. Meanwhile, data 402 (originally generated by electronic device 102A) may have arrived from electronic device 102B. Upon completion of writing data 404 to MCU 101, electronic device 102C may begin propagating data 402 to MCU 101.

Without any gap in transmission, or any further received commands or signals from MCU 101, such as on the serial data input port or chip select input port, electronic device 102C may repeat reading data from its data source to yield data, outputting this yielded data to its serial data output port, and copying data received at its serial data input port to the serial data output port. Electronic device 102C may again read data and begin writing the newly read data. This newly read data may be referred to as data 412. Electronic device 102C may begin writing data 412 to MCU 101 at a time of (ChainLength*DataLength), or nine bytes, after electronic device 102C first began writing data 406. If not otherwise stopped by MCU 101, electronic device 102C may repeat this process of reading new data and writing the newly read data to MCU 101 every nine bytes. Furthermore, electronic device 102C may again propagate received data 410 from electronic device 102B to MCU 101, followed by data 408 originating from electronic device 102A and received from electronic device 102B. Since there is no gap in transmission, the transmission may be improved or optimized, and this may reduce the effect of communication overhead, such as the need to propagate the read command.

As a result, MCU 101 may receive a continuous stream of data being read by electronic devices 102. The continuous stream may include a plurality of instances of read data from each electronic device 102. Moreover, such a continuous stream of data may be established by sending streaming mode entry command 314 once, followed by two changed edges of the CS signal. Additional sending of streaming mode entry command 314 or changed edges of the CS signal may be unnecessary for electronic devices 102 to continue reading data and sending it to MCU 101. MCU 101 may continue to receive as many cycles of read data from electronic devices 102 as needed. MCU 101 may be configured to pause, unpause and restart, or stop the continuous stream of data in any suitable manner. In one embodiment, this pausing, and subsequent unpausing and restarting may be performed without requiring additional commands to be propagated through the daisy chain. The absence of such additional commands needed for this functionality may reduce communication overhead.

In one embodiment, MCU 101 may be configured to pause the continuous stream of data by issuing a changed CS signal to electronic devices 102 as shown in FIG. 4. As a result, electronic devices 102 may be configured to pause outputting their read data and propagating received data based upon the changed CS signal. In another embodiment, MCU 101 may be configured to unpause and restart the continuous stream of data by issuing another changed CS signal to electronic devices 102. As a result, electronic devices 102 may be configured to resume outputting their read data and propagating received data based upon the changed CS signal.

For example, in FIG. 4, MCU 101 may issue a rising edge on an nCS signal to the CS ports of electronic devices 102. Each of electronic devices 102 may apply a high impedance to their SDO ports. In some cases, the rising edge on the nCS signal may arrive while electronic devices 102 are still reading and propagating data. If so, the effect of the rising edge on the nCS signal may be postponed until the presently executing read commands are finished executing and all data has been propagated through the daisy chain to MCU 101. After the rising edge on the nCS signal, each electronic device 102 may remain in daisy chain streaming mode, ready for streaming of data upon issuance of a subsequent falling edge on the nCS signal. MCU 101 may pause operations for any suitable length of time. Upon such a subsequent falling edge on the nCS signal, electronic devices 102 may return to operating in the manner illustrated in FIG. 4.

Figure 5A:
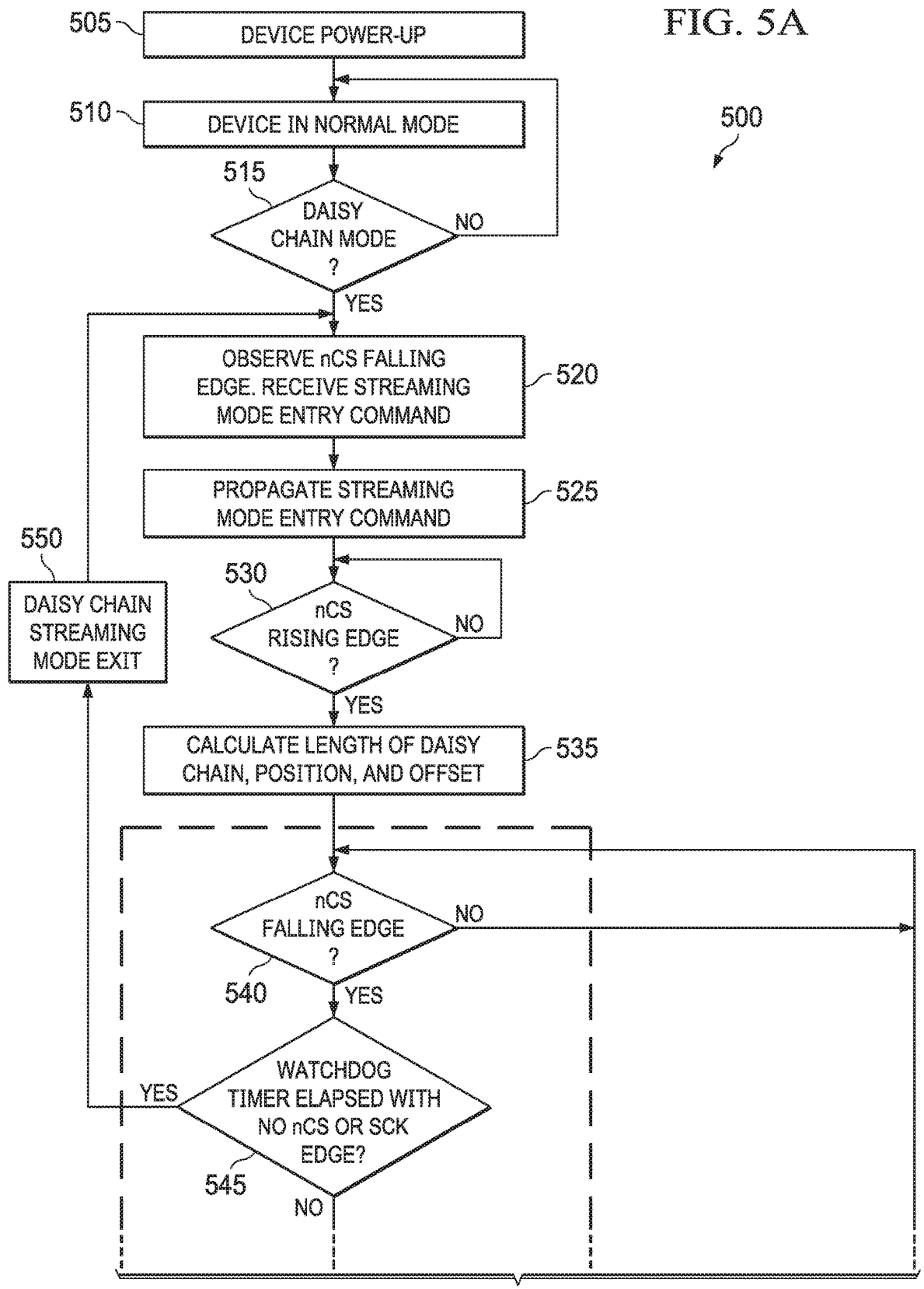
FIGS. 5A and 5B are illustrations of operation of a method for daisy chain streaming for an electronic device, according to embodiments of the present disclosure.
Figure 5B:
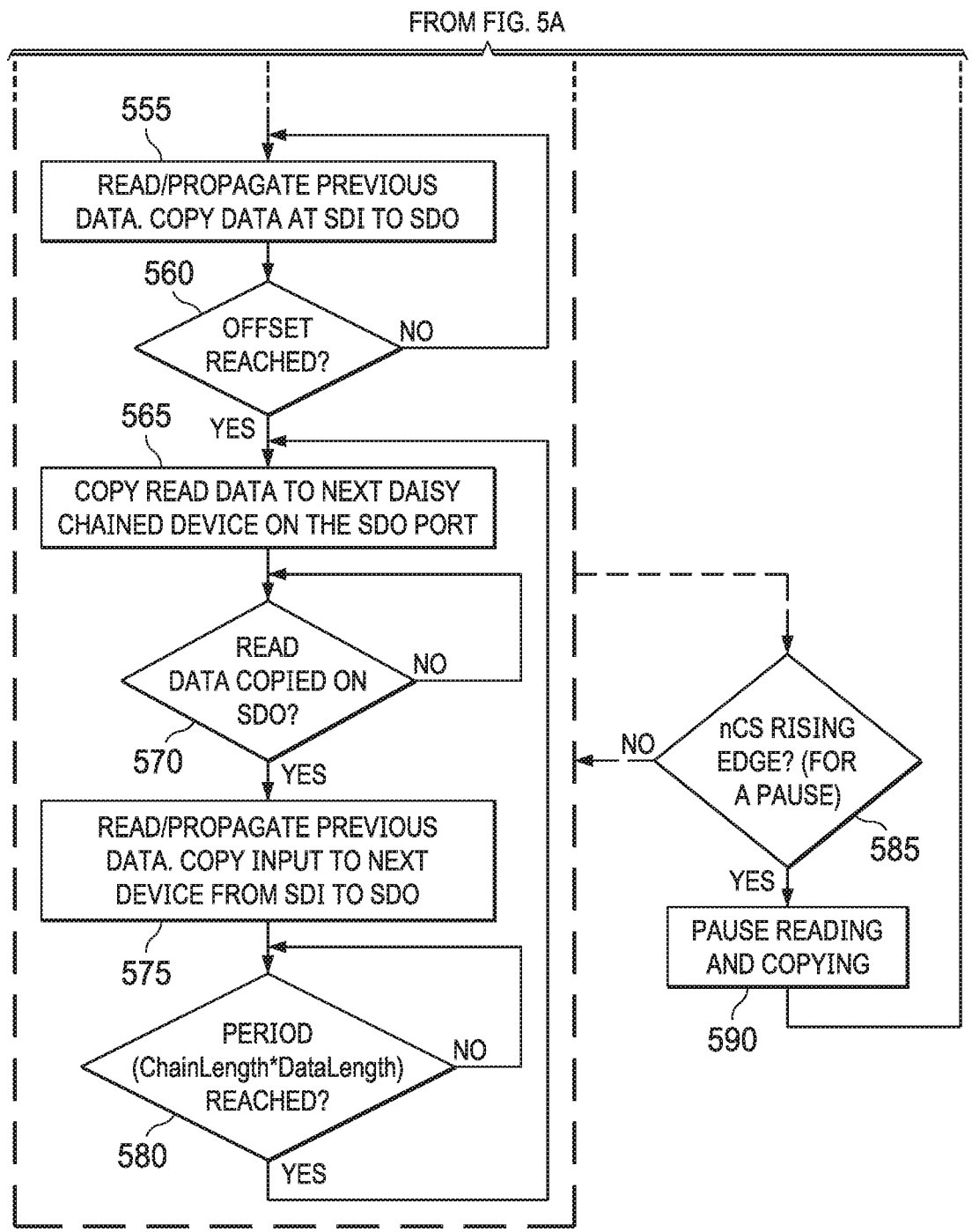

FIGS. 5A and 5B are illustrations of operation of a method 500 for daisy chain streaming, according to embodiments of the present disclosure. In particular, method 500 may illustrate operation electronic device 102. Method 500 may be implemented within, for example, SPI interface circuit 204 Method 500 may include fewer or more steps, may enter steps in a different order, repeat steps, or enter different step paths in parallel with respect to one another. Method 500 may begin at any suitable step, such as step 505.

At step 505, the electronic device, such as electronic device 102, may power-up. After performing any necessary boot or start-up tasks, method 500 may enter step 510. Step 505 may reflect normal operation for electronic device 102, when electronic device 102 is not propagating its inputs to its outputs in a daisy chain manner, nor sending such data to be propagated in a daisy chain manner.

At step 515, SPI interface circuit 204 may be configured to determine whether electronic device 102 is to enter daisy chain mode. SPI interface circuit 204 may make such a determination in any suitable manner. If so, method 500 may proceed to step 520. Otherwise, method 500 may repeat step 510 to operate in normal mode daisy chain mode.

At step 520, a falling edge on an nCS signal may be observed. Thereafter, a streaming mode entry command may be received. Electronic device 102 may count the time between the falling edge and receipt of the streaming mode entry command, and the time between the falling edge and a subsequent rising edge, in order to calculate the position of electronic device 102 within the daisy chain. At step 525, the streaming mode entry command may be propagated to other electronic devices 102 in the daisy chain.

At step 530, it may be determined whether there has been a receipt of a rising nCS signal, which may indicate that each electronic device 102 in the daisy chain has received the streaming mode entry command. If no such signal has been received, method 500 may repeat step 530. Otherwise, if such a signal has been received, method 500 may proceed to step 535.

At step 535, a delay between the time of the falling edge of step 520 and the rising edge observed in step 530 may be used to calculate the length of the daisy chain and the position of electronic device 102 in the daisy chain. These may be used in turn to determine an offset of when the electronic device is to copy its own read data into the daisy chain, as well as an offset of how often the electronic device is to copy its own read data into the daisy chain.

At step 540, it may be determined whether MCU 101 has issued an nCS falling edge, thus starting data streaming mode, or, if data streaming mode was previously paused, resuming data streaming mode. If not, method 500 may repeat step 540. If so, method 500 may proceed to step 545.

At step 545, it may be determined whether data streaming mode is to end. This may be determined by first setting a watchdog timer. In step 545, it may be determined whether the watchdog timer expires before a changed edge of the SCK signal or a changed edge of an nCS signal is received. The failure to receive such a changed edge may be interpreted as a reset signal. If the watchdog timer expires and there are no changed edges of the SCK or nCS signals, method 500 may proceed to step 550 to exit streaming mode. The watchdog timer may time a period given as Twatch, which may be, for expel, 50 microseconds. Otherwise, method 500 may proceed to step 555. Step 545 may be performed at any point after step 520, such as after any SCK edge, and preferably after step 540. In step 550, the electronic device may exit streaming mode return to step 520, reentering to normal daisy chain mode as opposed to streaming mode.

At step 555, previous data may be read by the electronic device. Any data received at the electronic device may be propagated to the next electronic device in the daisy chain. Data at the SDI port of the electronic device may be copied to the SDO port. The data to be read by the electronic device itself may be read.

At step 560, it may be determined whether the offset equal to (Position*(DataLength−1)) has been reached. If so, method 500 may proceed to step 565. If not, method 500 may repeat at step 555.

At step 565, the data read by the electronic device during performance of the read command may be copied to the next electronic device in the daisy chain. This data may be placed on the SDO port of the electronic device. The data transfer may last for DataLength bytes.

At step 570, it may be determined whether or not this data transfer initiated at step 565 has finished. If the read data has been copied on the SDO port of the electronic device, method 500 may proceed to step 575. Otherwise, method 500 may repeat step 570.

At step 575, the electronic device may resume copying and propagating any received data on its SDI port from electronic devices further up the daisy chain. This may be an operation similar to step 555.

At step 580, the electronic device may determine whether a period has elapsed since the beginning of the previous instance of writing its own read data to its SDO port. This period may be defined as ChainLength*DataLength If so, method 500 may repeat at step 565. Otherwise, method 500 may repeat at step 580.

In parallel with, before, or after any of steps 540, 550, 555, 560, 565, 570, 575, or 580, step 585 may be performed. At step 585, it may be determined whether a pause signal, such as an nCS rising edge, has been received. If so, reading and copying to the SDO port may be paused. The SDO port may be placed to high impedance. SDI and SCK ports may be disabled. The electronic device may remain in streaming mode. Method 500 may return to step 540. Execution of present instances of steps 540, 550, 555, 560, 565, 570, 575, and 580 may be terminated. At step 540, it may be determined in a resume or unpause signal, such as an nCS falling edge, has been received.

Otherwise, at step 585, method 500 may return to continue to execute steps 540, 550, 555, 560, 565, 570, 575, and 580.

Figure 6:
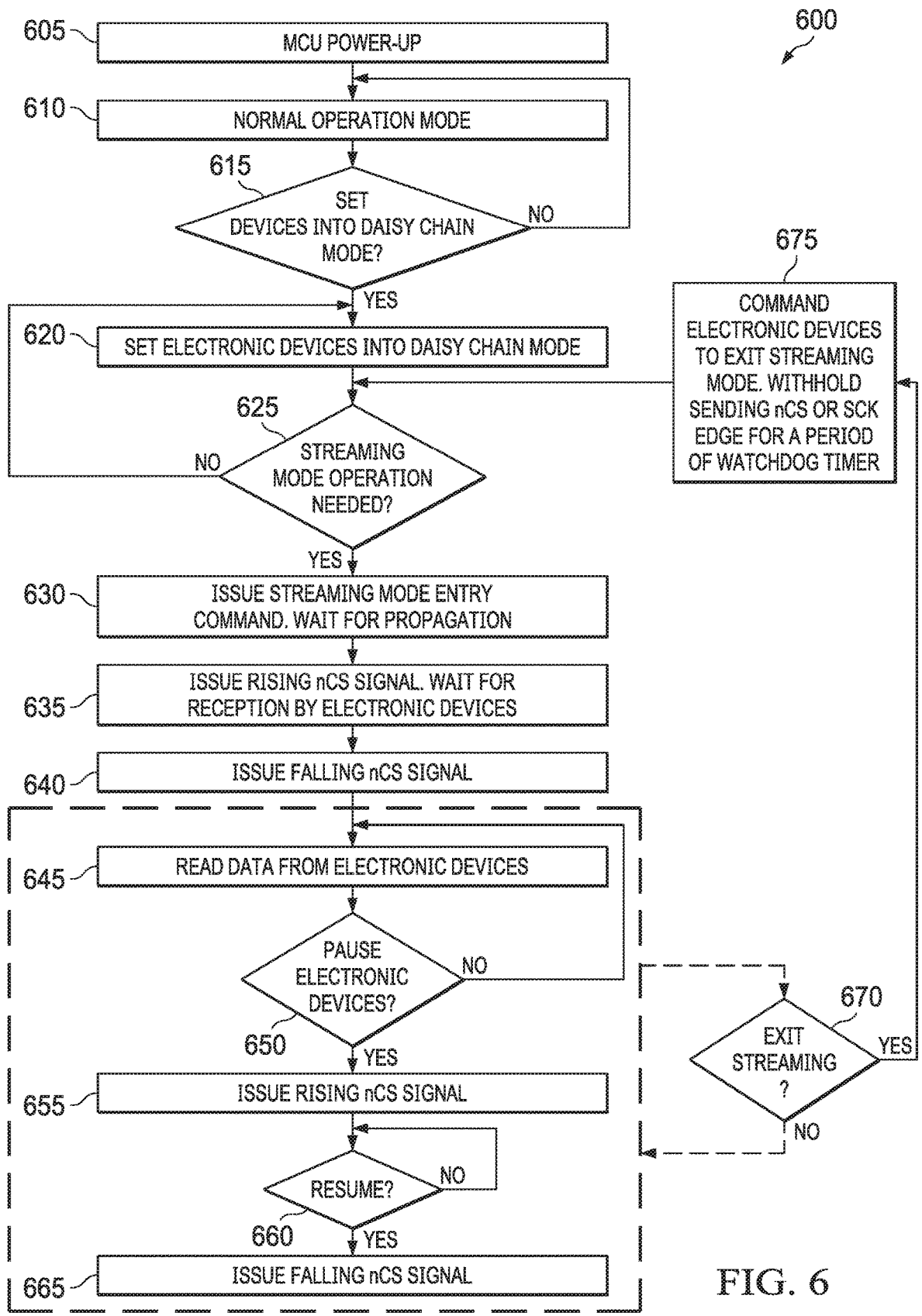
FIG. 6 is an illustration of operation of another method for daisy chain streaming mode entry and command execution for a master control unit, according to embodiments of the present disclosure.

FIG. 6 is an illustration of operation of another method 600 for daisy chain streaming mode entry and command execution, according to embodiments of the present disclosure. In particular, method 600 may illustrate operation of MCU 101. Method 600 may be implemented within, for example, SPI interface circuit 202. Method 600 may include fewer or more states, may enter states in a different order, repeat states, or enter different state paths in parallel with respect to one another. Method 600 may be implemented by, for example, a state machine in SPI interface circuit 202. Method 600 may begin at any suitable step, such as step 1005.

At step 605, the MCU, such as MCU 101, may power-up. After performing any necessary boot or start-up tasks, method 600 may enter step 610. Step 610 may reflect normal operation for MCU 101, when MCU 101 is not sending data to electronic devices 102 in a daisy chain manner, nor receiving such data propagated in a daisy chain manner.

At step 615, an interface circuit of the MCU, such as SPI interface circuit 202, may be configured to determine whether to put electronic devices 102 into a daisy chain mode. If not, method 600 may return to step 610. Otherwise, method 600 may proceed to step 620. At step 620, the MCU may place electronic devices in the daisy chain into a daisy chain mode. Step 620 may be performed in any suitable manner. At step 625, an interface circuit of the MCU, such as SPI interface circuit 202, may be configured to determine whether to put electronic devices 102 into a daisy chain streaming mode of operation based upon a needed daisy chain operation. If so, method 600 may proceed to step 630. Otherwise, method 600 may repeat at step 620.

At step 630, a streaming mode entry command may be issued, and propagation of the command may be awaited.

At step 635, a signal such as a rising edge of an nCS signal may be issued to electronic devices 102 to signal that the command has propagated to each electronic device. SPI interface circuit 202 may wait for reception of the signal by electronic devices 102.

At step 640, a signal such as a falling edge of an nCS signal may be issued to electronic devices 102 to signal that electronic devices 102 are to begin daisy chain streaming mode, according to the command.

At step 645, data may be read from electronic devices 102 as it arrives from the end of the daisy chain.

At step 650, it may be determined whether electronic devices 102 should pause their operation. If so, method 600 may proceed to step 655. Otherwise, method 600 may return to step 645.

At step 655, a signal such as a rising edge of an nCS signal may be issued to electronic devices 102 to signal that they are to pause their reading and copying operation.

At step 660, it may be determined whether operation of electronic devices 102 is to resume. If not, method 600 may repeat step 660. If so, method 600 may proceed to step 665.

At step 665, a signal such as a falling edge of an nCS signal may be issued to electronic devices 102 to signal that they are to resume reading and propagating data. Method 600 may return to step 640.

In parallel with, before, or after any of steps 645, 650, 655, 660, and 665, method 600 may perform step 670. In step 670, it may be determined whether data streaming mode is to be exited. If so, method 600 may proceed to step 675. Otherwise, method 600 may continue to execute steps 645, 650, 655, 660, and 665.

At step 675, the streaming mode may be exited in any suitable manner. The electronic devices may be commanded to exit streaming mode. For example, the MCU might not send an nCS or SCK pulse to the electronic devices for a period timed by watchdog timers of the electronic devices. Method 600 may return to step 625.

Although example embodiments have been described above, other variations and embodiments may be made from this disclosure without departing from the spirit and scope of these embodiments.

We claim:

1. An apparatus, comprising:
a serial data input port configured to receive input from a first electronic device;
a serial data output port configured to send output to a second electronic device;
a chip select input port configured to receive input from a master control unit; and
an interface circuit configured to, in a daisy chain streaming mode, based on a single instance of a first received command and on a first changed edge of a chip select signal on the chip select input port, repeatedly:
read data from a data source of the apparatus to yield first data;
output the first data to the serial data output port; and
copy data received at the serial data input port to the serial data output port after the first data.

2. The apparatus of claim 1, wherein the interface circuit is further configured to repeat, without another reception of a second command or additional signals received on the chip select input port, the reading data from the data source to yield first data, outputting the first data to the serial data output port, and copying data received at the serial data input port to the serial data output port.

3. The apparatus of claim 1, wherein the interface circuit is further configured to enter the daisy chain streaming mode based upon:
reception of the first received command through the serial data input port; and
subsequently, reception of one or more second changed edges of the chip select signal on the chip select input port.

4. The apparatus of claim 3, wherein the interface circuit is further configured to output the first data to the serial data output port at a time based upon a position of the apparatus in a daisy chain of electronic devices, a length of data to be read by the apparatus, or a number of electronic devices in the daisy chain of electronic devices.

5. The apparatus of claim 1, wherein the interface circuit is further configured to pause the repeatedly outputting the first data to the serial data output port and copying data received at the serial data input port to the serial data output port based upon a second changed edge of the chip select signal on the chip select input port.

6. The apparatus of claim 5, wherein the interface circuit is further configured to resume the repeatedly outputting the first data to the serial data output port and copying data received at the serial data input port to the serial data output port based upon a third changed edge of the chip select signal on the chip select input port.

7. An apparatus, comprising:
a serial data output port configured to send output data to a first electronic device;
a serial data input port configured to receive input data from a second electronic device;
a chip select output port configured to send output to a plurality of electronic devices, the plurality of electronic devices connected in a daisy chain and including the first and second electronic devices; and
an interface circuit, configured to:
set the plurality of electronic devices in a daisy chain streaming mode with:
a first command issued through the serial data output port; and
a first changed edge on a chip select signal issued through the chip select output port;
wherein, in the daisy chain streaming mode, each given electronic device is configured to, based on a single received instance of the first command, repeatedly:
read data from a data source of the given electronic device to yield first data;
output the first data to a next electronic device in the daisy chain; and
output a received data received from a previous electronic device in the daisy chain to the next electronic device in the daisy chain;
through the serial data input port, receive a continuous and uninterrupted stream of data read by the plurality of electronic devices, the continuous and uninterrupted stream of data including at least two instances of first data from each of the plurality of electronic devices.

8. The apparatus of claim 7, wherein the interface circuit is further configured to cause the plurality of electronic devices to repeatedly provide the continuous and uninterrupted stream of data without issuance of a second command or additional signals on the chip select output port.

9. The apparatus of claim 7, wherein the interface circuit is further configured to cause the plurality of electronic devices to enter the daisy chain streaming mode based upon issuance of a second changed edge on a chip select signal issued through the chip select output port.

10. The apparatus of claim 7, wherein the interface circuit is further configured to cause the plurality of electronic devices to output the first data to the serial data output port at a time based upon a position of a respective electronic device in the daisy chain of electronic devices, a length of data to be read by each electronic devices, or a number of electronic devices in the daisy chain of electronic devices.

11. The apparatus of claim 7, wherein the interface circuit is further configured to pause the daisy chain streaming mode by issuing a second changed edge of the chip select signal on the chip select output port.

12. The apparatus of claim 11, wherein the interface circuit is further configured to resume the daisy chain streaming mode by issuing a third changed edge of the chip select signal on the chip select output port.

13. A method, comprising:
a serial data input port, receiving input from a first electronic device;
through a serial data output port, sending output to a second electronic device;
through a chip select input port, receiving input from a master control unit; and
in a daisy chain streaming mode, based on a single instance of a first received command and on a first changed edge of a chip select signal on the chip select input port, repeatedly:
reading data from a data source of the apparatus to yield first data;
outputting the first data to the serial data output port; and
copying data received at the serial data input port to the serial data output port after the first data.

14. The method of claim 13, further comprising repeating, without another reception of a second command or additional signals received on the chip select input port, the steps of reading data from the data source to yield first data, outputting the first data to the serial data output port, and copying data received at the serial data input port to the serial data output port.

15. The method of claim 13, further comprising outputting the first data to the serial data output port at a time based upon a position of the apparatus in a daisy chain of electronic devices, a length of data to be read by the apparatus, or a number of electronic devices in the daisy chain of electronic devices.

16. The method of claim 15, further comprising pausing the steps of repeatedly outputting the first data to the serial data output port and copying data received at the serial data input port to the serial data output port based upon a second changed edge of the chip select signal on the chip select input port.

17. A method, comprising:
through a serial data output port, sending output data to a first electronic device;
through a serial data input port, receiving input data from a second electronic device;
through a chip select output port, sending output to a plurality of electronic devices, the plurality of electronic devices connected in a daisy chain and including the first and second electronic devices;
setting the plurality of electronic devices in a daisy chain streaming mode with:

a first command issued through the serial data output port; and a first changed edge on a chip select signal issued through the chip select output port;

wherein, in the daisy chain streaming mode, each given electronic device, based on a single instance of the first command, repeatedly:

reads data from a data source of the given electronic device to yield first data;

outputs the first data to a next electronic device in the daisy chain; and outputs a received data received from a previous electronic device in the daisy chain to the next electronic device in the daisy chain; and through the serial data input port, receiving a continuous and uninterrupted stream of data read by the plurality of electronic devices, the continuous and uninterrupted stream of data including at least two instances of first data from each of the plurality of electronic devices.

18. The method of claim 17, further comprising causing the plurality of electronic devices to enter the daisy chain streaming mode based upon issuance of a second changed edge on a chip select signal issued through the chip select output port.

19. The method of claim 17, further comprising causing the plurality of electronic devices to output the first data to the serial data output port at a time based upon a position of a respective electronic device in the daisy chain of electronic devices, a length of data to be read by each electronic devices, or a number of electronic devices in the daisy chain of electronic devices.

20. The method of claim 17, further comprising pausing the daisy chain streaming mode by issuing a second changed edge of the chip select signal on the chip select output port.

* * * * *